(12) United States Patent
Cui et al.

(10) Patent No.: US 10,827,549 B2
(45) Date of Patent: Nov. 3, 2020

(54) FACILITATING AUTOMATIC NEIGHBOR RELATIONSHIPS FOR 5G OR OTHER NEXT GENERATION NETWORK

(71) Applicant: AT&T Intellectual Property I, L.P., Atlanta, GA (US)

(72) Inventors: Zhi Cui, Sugar Hill, GA (US); Hongyan Lei, Plano, TX (US); Milap Majmundar, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 44 days.

(21) Appl. No.: 16/241,388

(22) Filed: Jan. 7, 2019

(65) Prior Publication Data

US 2020/0221521 A1     Jul. 9, 2020

(51) Int. Cl.
| | |
|---|---|
| *H04W 4/00* | (2018.01) |
| *H04W 76/15* | (2018.01) |
| *H04W 88/06* | (2009.01) |
| *H04W 88/08* | (2009.01) |

(52) U.S. Cl.
CPC ............ *H04W 76/15* (2018.02); *H04W 88/06* (2013.01); *H04W 88/08* (2013.01)

(58) Field of Classification Search
CPC ...... H04W 76/15; H04W 88/08; H04W 88/06
USPC ........................................................ 370/328
See application file for complete search history.

(56) References Cited

U.S. PATENT DOCUMENTS

| | | |
|---|---|---|
| 8,954,079 B2 | 2/2015 | Yi et al. |
| 8,983,469 B2 | 3/2015 | He et al. |
| 9,294,963 B2 | 3/2016 | Masini et al. |
| 9,344,929 B2 | 5/2016 | Shetigar et al. |
| 9,635,566 B2 | 4/2017 | Cui et al. |
| 9,918,239 B2 | 3/2018 | Thomas et al. |
| 9,924,418 B1 | 3/2018 | Cuberovic |

(Continued)

FOREIGN PATENT DOCUMENTS

| | | |
|---|---|---|
| GB | 2 550 212 A | 11/2017 |
| WO | 2014154277 A1 | 10/2014 |

(Continued)

OTHER PUBLICATIONS

Moysen, Jessica, et al. "From 4G to 5G: Self-organized Network Management meets Machine Learning." Computer Communications (2018). arXiv:1707.09300v2 [cs.NI] Jan. 16, 2018. 23 pages.

(Continued)

*Primary Examiner* — Mang Hang Yeung
(74) *Attorney, Agent, or Firm* — Amin, Turocy & Watson, LLP

(57) ABSTRACT

Additional attributes to $5^{th}$ generation (5G) neighbor cell relationships can be incorporated into a neighbor cell relationship table (NCRT). Messages between centralized units can support a hierarchical neighbor relation structure in a virtualized 5G radio access network (RAN). The additional attributes can improve the efficiency of 5G neighbor relation management via intra-centralized unit, inter-centralized unit, inter-radio access technology, and intra-radio access technology mobility management. 5G new radio (NR) long-term evolution (LTE) dual connectivity performance can also be improved by enabling the dual connectivity in the best suitable 5G NR cell.

20 Claims, 12 Drawing Sheets

(56) References Cited

U.S. PATENT DOCUMENTS

| | | | |
|---|---|---|---|
| 9,930,542 | B2 | 3/2018 | Bazar et al. |
| 2011/0228687 | A1 | 9/2011 | Catovic et al. |
| 2017/0034750 | A1 | 2/2017 | Tamura et al. |
| 2017/0048870 | A1 | 2/2017 | Lu |
| 2017/0070896 | A1 | 3/2017 | Shindo |
| 2018/0035334 | A1 | 2/2018 | Lohar et al. |
| 2018/0184480 | A1* | 6/2018 | Chandramouli ...... H04W 48/12 |
| 2018/0359672 | A1* | 12/2018 | Keller .................. H04L 67/141 |
| 2019/0058997 | A1* | 2/2019 | Futaki .................. H04W 36/26 |
| 2019/0182762 | A1* | 6/2019 | Mutikainen ........... H04W 48/18 |
| 2019/0327782 | A1* | 10/2019 | Yang ..................... H04W 76/16 |
| 2020/0059945 | A1* | 2/2020 | Park ...................... H04W 48/16 |

FOREIGN PATENT DOCUMENTS

| | | |
|---|---|---|
| WO | 2018052343 A1 | 3/2018 |
| WO | 2018171866 A1 | 9/2018 |
| WO | 2018202539 A1 | 11/2018 |
| WO | 2018204863 A1 | 11/2018 |

OTHER PUBLICATIONS

Gorcin, Ali, et al. "Hybrid Automatic Neighbor Relations for 5G Wireless Networks." Wireless Communication Systems (ISWCS), 2017 International Symposium on. IEEE, 2017. https://arxiv.org/pdf/1707.07271.pdf. 6 pages.

Amirijoo, Mehdi, et al. "Neighbor Cell Relation List and Physical Cell Identity Self-Organization in LTE." Communications Workshops, ICC Workshops' 08, IEEE International Conference, IEEE, 2008. 5 pages.

Shin, Yoonsu, et al. "Virtualized ANR to Manage Resources for Optimization of Neighbour Cell Lists in 5G Mobile Wireless Networks." Mobile Information Systems vol. 2017, Article ID 9643401. https://doi.org/10.1155/2017/9643401. 10 pages.

International Search Report and Written Opinion for International Application Serial No. PCT/US20/12267 dated Apr. 20, 2020, 15 pages.

3GPP, "3rd Generation Partnership Project; Technical Specification Group Radio Access Network; NR; NR and NG-RAN Overall Description; Stage 2 (Release 15)", XP051576844, Retrieved from the Internet: URL:http://www.3gpp.org/ftp/tsg%5Fran/WG2%5FRL2/Specifications/201812%5Fdraft%5Fspecs%5Fafter/05FRAN%5F82/Draft%5F38300%2Df40%2Ezip, Jan. 2, 2019, http://www.3gpp.org, 97 pages.

"OPPO: Discussion on ANR Functionality for eLTE", 3GPP Draft; [NR-CP]R2-1710183 Discussion on ANR Functionality for ELTE, 3rd Generation Partnership Project (3GPP), XP051342066, Retrieved from the Internet:URL:http://www.3gpp.org/ftp/Meetings_3GPPSYNC/RAN2/Docs/, retrieved on Oct. 8, 2017, 3 pages.

VIVO: "Introduce ANR in NR", 3GPP Draft; R2-1807630_Introduce ANR in NR, 3rdGeneration Partnership Project (3GPP), XP051443987, Retrieved from the Internet:URL:http://www.3gpp.org/ftp/Meetings%5F3GPP%5FSYNC/RAN2/Docs/, retrieved on May 20, 2018, 5 pages.

"3rd Generation Partnership Project; Technical Specification Group Radio Access Network; NG-RAN; Xn application protocol (XnAP) (Release 15)" 3GPP TS 38.423 V15.1.0 (Sep. 2018). 346 pages.

"LTE; Evolved Universal Terrestrial Radio Access (E-UTRA) and Evolved Universal Terrestrial Radio Access Network E-UTRAN); Overall description; Stage 2 (3GPP TS 36.300 version 14.2.0 Release 14)" 3GPP, ETSI TS 136 300 V14.2.0 (Apr. 2017), 346 pages.

"5G; NR; Overall description; Stage-2 (3GPP TS 38.300 version 15.3.1 Release 15)" 3GPP, ETSI TS 138 300 V15.3.1 (Oct. 2018), 90 pages.

\* cited by examiner

600

| NCR | TCI No Remove | No HO | No DC | RAT | DU | CU | Virtualization | LTE-5GNR DC Preference |
|---|---|---|---|---|---|---|---|---|
| 1 | x | No | x | 5G | DU1 | CU1 | Yes | No Support |
| 2 | x | | x | 5G | DU1 | CU1 | Yes | No Support |
| 3 | x | | x | 5G | DU2 | CU1 | Yes | Preferred |
| 4 | | | x | 5G | DU3 | CU2 | Yes | Preferred |

602

| NCR | TCI No Remove | No HO | No DC | RAT | DU | CU | Virtualization | LTE-5GNR DC Preference |
|---|---|---|---|---|---|---|---|---|
| 1 | | | | LTE | | | No | Preferred |

FIG. 6

FACILITATING AUTOMATIC NEIGHBOR RELATIONSHIPS FOR 5G OR OTHER NEXT GENERATION NETWORK

TECHNICAL FIELD

This disclosure relates generally to facilitating automatic neighbor relationships. For example, this disclosure relates to facilitating automatic neighbor relationships to support radio access networks for a 5G (virtualized or not), or other next generation network, air interface.

BACKGROUND

5th generation (5G) wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to automatic neighbor relationships is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 6 illustrates an example schematic system block diagram of a 5G intra-radio access technology neighbor cell relationship and inter-radio access technology neighbor cell relationship table according to one or more embodiments.

DETAILED DESCRIPTION

Figure 1:
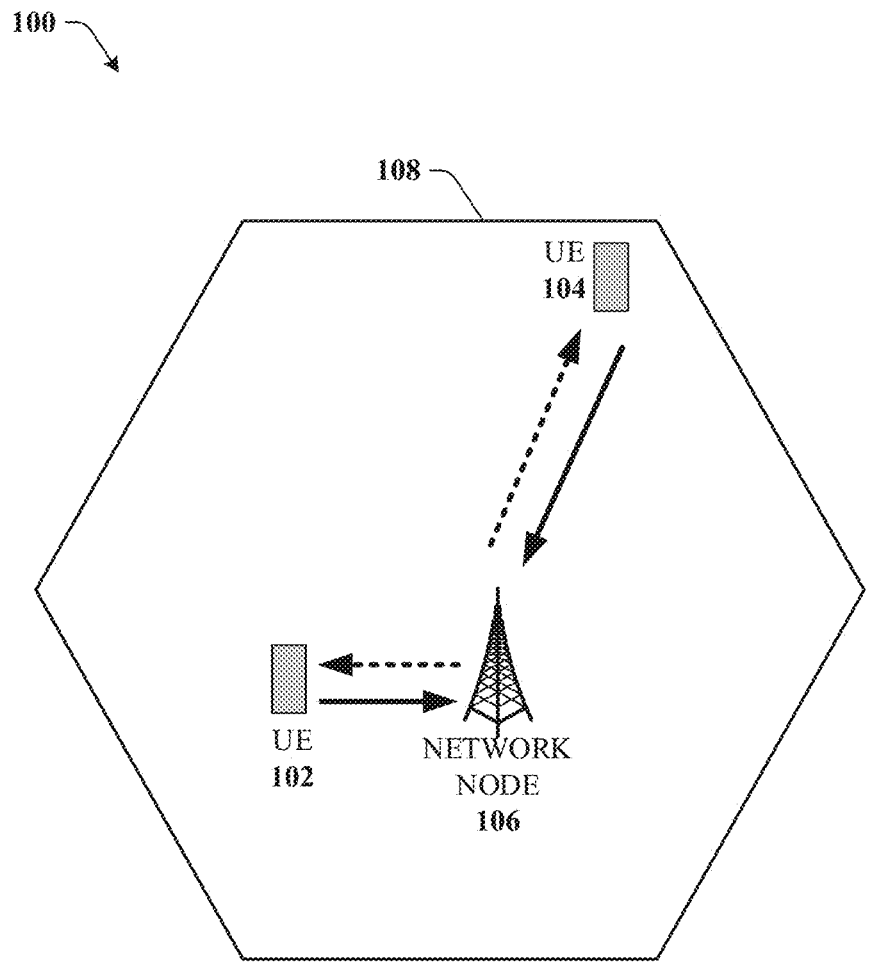
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate automatic neighbor relationships for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate automatic neighbor relationships for a 5G network. Facilitating automatic neighbor relationships for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

LTE-5G NR dual connectivity (DC) can enable new UEs to connect to both LTE and 5G to achieve high throughput via 5G NR and maintain coverage and reliability by anchoring the signaling (control plane) in LTE. DC can also minimize a control plane signaling load to the core network. In the early stage of 5G NR deployment, 5G NR can be connected to an LTE core system for user plane traffic. In a later phase, 5G next generation core (NGC) can be standardized and sub-6 Ghz band NRs (that co-exist with LTE or not) can also be available. Many 5G options, (e.g. 3GPP Option 2), can become viable for UEs to take advantage of the 5G NGC for its features as well as the 5G NR coverage. In that case, 5G NR can become an anchor cell for both control and user plane traffic. In addition, network virtualization and SDN can provide improved programmability, time to market, etc. 5G RAN can be decomposed and some of the RAN functions, such as the non-real time functions (more precisely the L3 and part of L2 functions for both control plane and user plane) can be centralized and virtualized (e.g., vCU), and the real time RAN functions can be distributed to or close to the cell sites (e.g., donor unit (DU)/radio unit (RU)). This disclosure provides an enabler of 5G RAN, the 5G automatic neighbor relationship (ANR), to optimize the mobility management to select the best anchor cell (either LTE or 5G NB) while supporting various deployments and 5G virtualization.

As described earlier, 5G ANR can support both 5G and LTE neighbors, and the hierarchical 5G structure (virtualized or not). The following uses virtualized 5G RAN as an example to illustrate. For a virtualized 5G system, each individual 5G transmission reception point (TRP) does not need to support an individual ANR table. Instead, the vRAN vCU can host a neighbor cell relation table (NCRT) on behalf of the TRPs supported by the vCU. hierarchical NR structure, wherein the NCRT can comprise a vCU layer, a DU layer, and a TRP layer to support virtualized RAN (e.g., NR or LTE). There can be separate inter-radio access technology (RAT) (e.g. LTE, 5G) and intra-RAT NCRTs at each vCU. For a given 5G vCU intra-RAT NCRT, it can contain the TRPs, as well as the neighbor 5G TRPs of its immediate neighbor from another vCU. 5G I-RAT NCRT can contain the neighbor relations with a different RAT (e.g. LTE) node. Additional attributes, such as LTE-5G NR dual connectivity DC preference, gNodeB central unit (gNB-CU) identification (ID), gNB DU ID, etc. and possible vendor proprietary attributes, such as virtualization, etc. in the NCRTs and in the X2/Xn information exchange. Existing can comprise: no remove, no handover (HO), no Xn.

For example, no remove means that the gNB cannot remove a neighbor cell relation from the NCRT when running the function to remove aged NRs. Additional attributes can be added to the NCRT. In order to enable 5G ANR in virtualized RAN, additional information element (IEs) to 3GPP standard. For example, a gNB-DU ID field can be added in relation to the 5G NR TRPs in the vCU ANR table. A gNB-CU ID field can be added in relation to the 5G NR TRPs in the vCU ANR table. A RAT field can be added for each BTS in the vCU ANR table. A 5G NR-LTE DC preference field can be added for each TRPs in the vCU ANR table. In a virtualized RAN environment, since the ANR table can be stored at the CU, there is no need to exchange neighbor relation IEs when the UE moves within a CU coverage range. When the UE moves at the border of two CUs, neighbor relation IEs can be exchanged. Example, the new neighbor relation IEs can be shown in 5G gNB-vCU Xn message. The message can be sent by a gNB-CU to a peer gNB-CU to transfer updated information. The additional ANR attribute IEs can be added as a field of a served cell information NR IE.

In one embodiment, described herein is a method comprising receiving, by a wireless network device comprising a processor, wireless data from a first base station device of a wireless network, wherein the first base station device is a new radio donor unit device, and wherein the wireless network device is a virtualized central unit device. The method can comprise connecting, by the wireless network device, to a first core network device of a first core network and a second core network device of a second core network, wherein the first core network is a next generation core network, and wherein the second core network is an evolved packet core network. Additionally, the method can comprise connecting, by the wireless network device, to a second base station device to facilitate a communication between a mobile device and the evolved packet core network, wherein the second base station device is a long-term evolution base station device.

According to another embodiment, a system can facilitate, receiving wireless data from a first base station device of a wireless network, wherein the first base station device is a new radio donor unit device. The system can comprise connecting to a first core network device of a first core network and a second core network device of a second core network, wherein the first core network is a next generation core network, and wherein the second core network is an evolved packet core network. Furthermore, the system can comprise connecting to a second base station device to facilitate a communication between a mobile device and the evolved packet core network, wherein the second base station device is a long-term evolution base station device.

According to yet another embodiment, described herein is a machine-readable storage medium that can perform the operations comprising receiving, by a virtualized central unit device, wireless data from a first base station device of a wireless network, wherein the first base station device is a new radio donor unit device. The machine-readable storage medium can perform the operations comprising communicating with a first core network device of a first core network and a second core network device of a second core network, wherein the first core network is a next generation core network, and wherein the second core network is an evolved packet core network. Furthermore, the machine-readable storage medium can perform the operations comprising communicating with a second base station device to facilitate a communication between a mobile device and the evolved packet core network, wherein the second base station device is a long-term evolution base station device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 106 represents an uplink (UL) communication.

System 100 can further include one or more communication service provider networks 108 that facilitate providing wireless communication services to various UEs, including UE 102, via the network node 106 and/or various additional network devices (not shown) included in the one or more communication service provider networks 108. The one or more communication service provider networks 108 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 108 can be or include the wireless communication network and/or various additional devices and components of the wireless communication network (e.g., additional network devices and cell, additional UEs, network server devices, etc.). The network node 106 can be connected to the one or more communication service provider networks 108 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
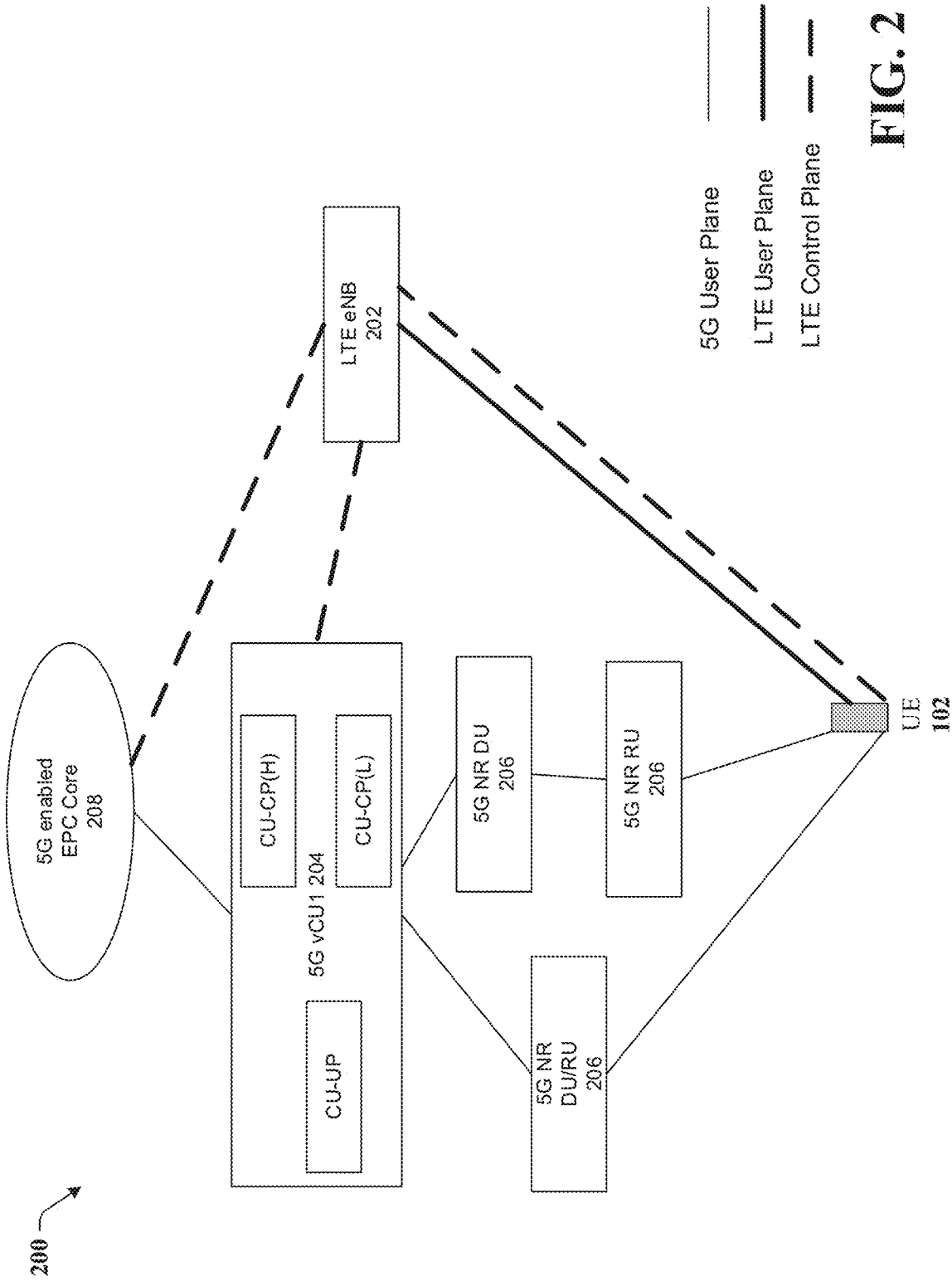
FIG. 2 illustrates an example schematic system block diagram of a 5G new radio architecture according to one or more embodiments.
Figure 3:
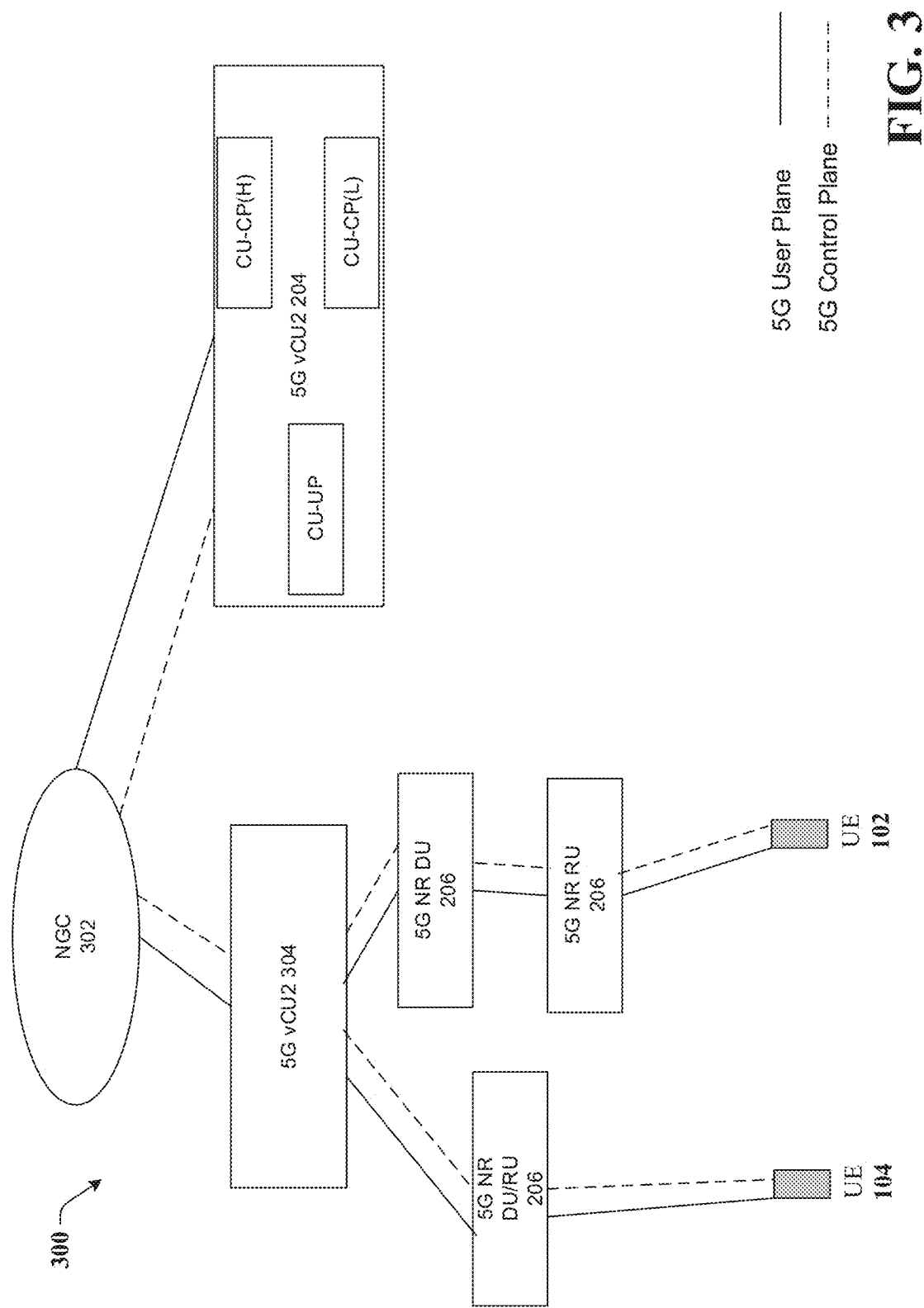
FIG. 3 illustrates an example schematic system block diagram of a 5G new radio architecture according to one or more embodiments.

Referring now to FIG. 2 and FIG. 3, illustrated are an example schematic system block diagram of a 5G new radio architecture for option 3x and option 2 according to one or more embodiments. System 200 comprises an LTE eNB 202, 5G vCU1 204 capacity with NR 206 for additional bandwidth under a 5G enabled evolved packet core (EPC) 208. 5G can be comprised of the NRs 206 comprising DUs and/or RUs, which can be co-located or distributed. The CU can be virtualized and hosted at the vCU1 204 or not virtualized. For example, as shown, multiple DUs and RUs are shown within the NRs 206. In FIG. 2, The UE 102 can communicate with the multiple NRs 206, for user plane traffic, and the LTE eNB 202, for both the user plane and a control plane traffic, simultaneously. The LTE eNB 202 can then communicate with the 5 g vCU1 204 and the 5G enabled EPC 208 via an LTE control plane signal. The LTE eNB 202 can also communicate with the UE 102 via an LTE user plane signal. The 5G NR can reside on the vCU1 204. Although a 5G NR cell can be covered by a first VCU1 204, it can still be a neighbor (e.g., an immediate neighbor) of another 5G NR cell covered by a second VCU2 304. Therefore, the neighbor relationship can be listed in an NCRT. Neighbors can be based on inter-RAT or intra-RAT relationships.

With regards to FIG. 3, both the user plane and control plane signals can be communicated from the UEs 102, 104 to the next generation core (NGC) 302 via the 5G vCU2 304 and the NRs 206. This data can also be communicated to the vCU1 204. Thus, corresponding neighbor relationships of the NRs 206 of the 5G vCU2 304 and/or the vCU1 204 can be stored at the 5G vCU 304 and/or the vCU 204.

Figure 4:
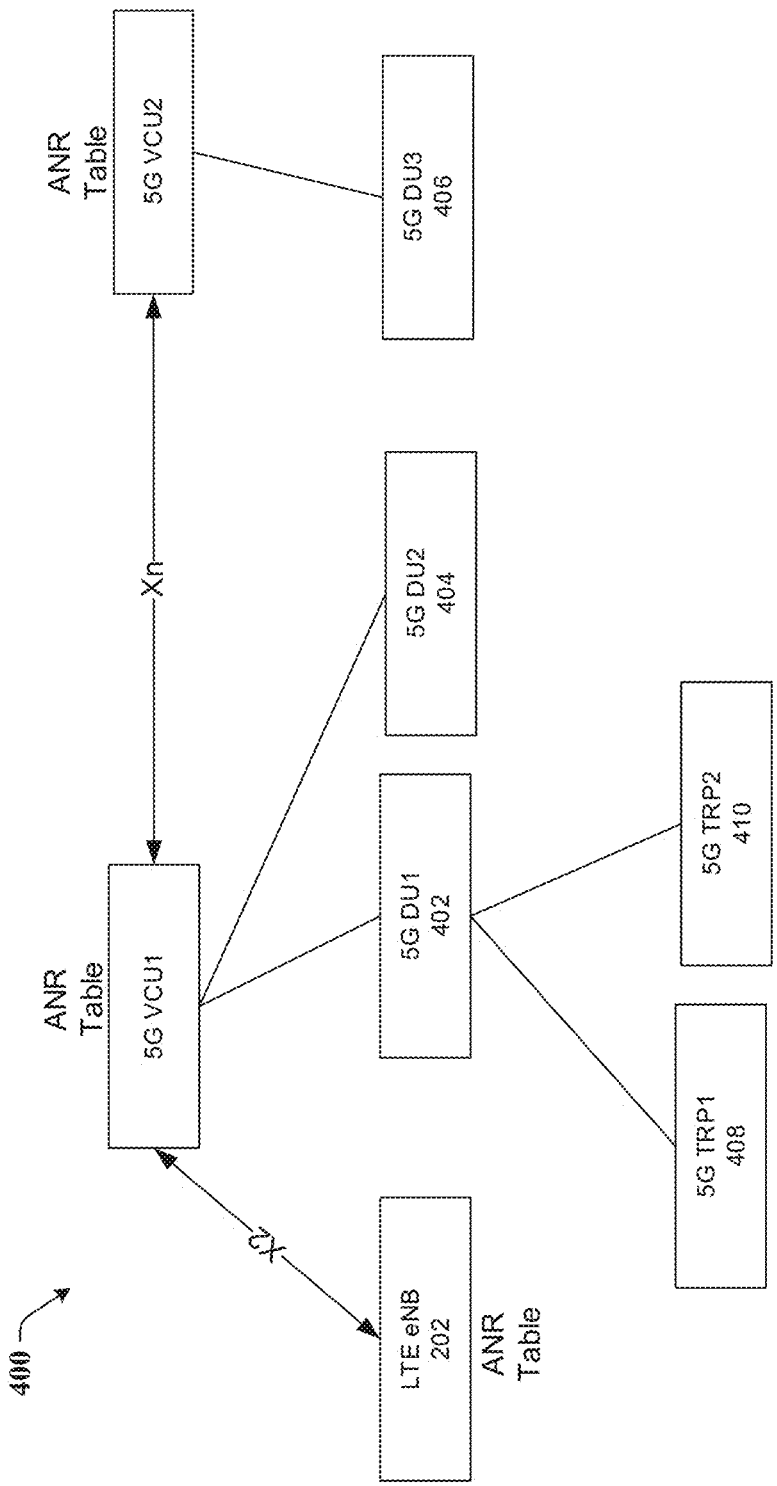
FIG. 4 illustrates an example schematic system block diagram of an automatic neighbor relationship according to one or more embodiments.

Referring now to FIG. 4, illustrated is an example schematic system block diagram of an automatic neighbor relationship according to one or more embodiments. Depicts a 5G hierarchical structure comprising VCUs 204, 304, DUs 402, 404, 406, LTE eNB 202, and TRPs 408, 410. It should be noted that in any embodiment, the CU can be virtualized or not virtualized. However, the CU can host the NCRT for the inter-RAT and/or the intra-RAT, whereas IRAT is mainly for 5G and LTE. For example, the 5G DU2 404 is depicted as a neighbor to the 5G DU3 406 even though they are being serviced by vCU 204 and vCU2 304 (different vCUs), respectively. This data can be communicated between the vCU1 204 and the vCU2 304 via the Xn interface. It should also be noted that the LTE eNB 202 can communicate with the vCU1 204 via an X2 interface. The DU1 402 can be a neighbor to the DU2 404, and the TRP1 408 can also be a neighbor to the TRP2 410. These various neighbor relationships can be hosted within automatic neighbor relationship tables that can be stored at the LTE eNB 202, the VCU1 204, and/or the VCU2 304.

Figure 5:
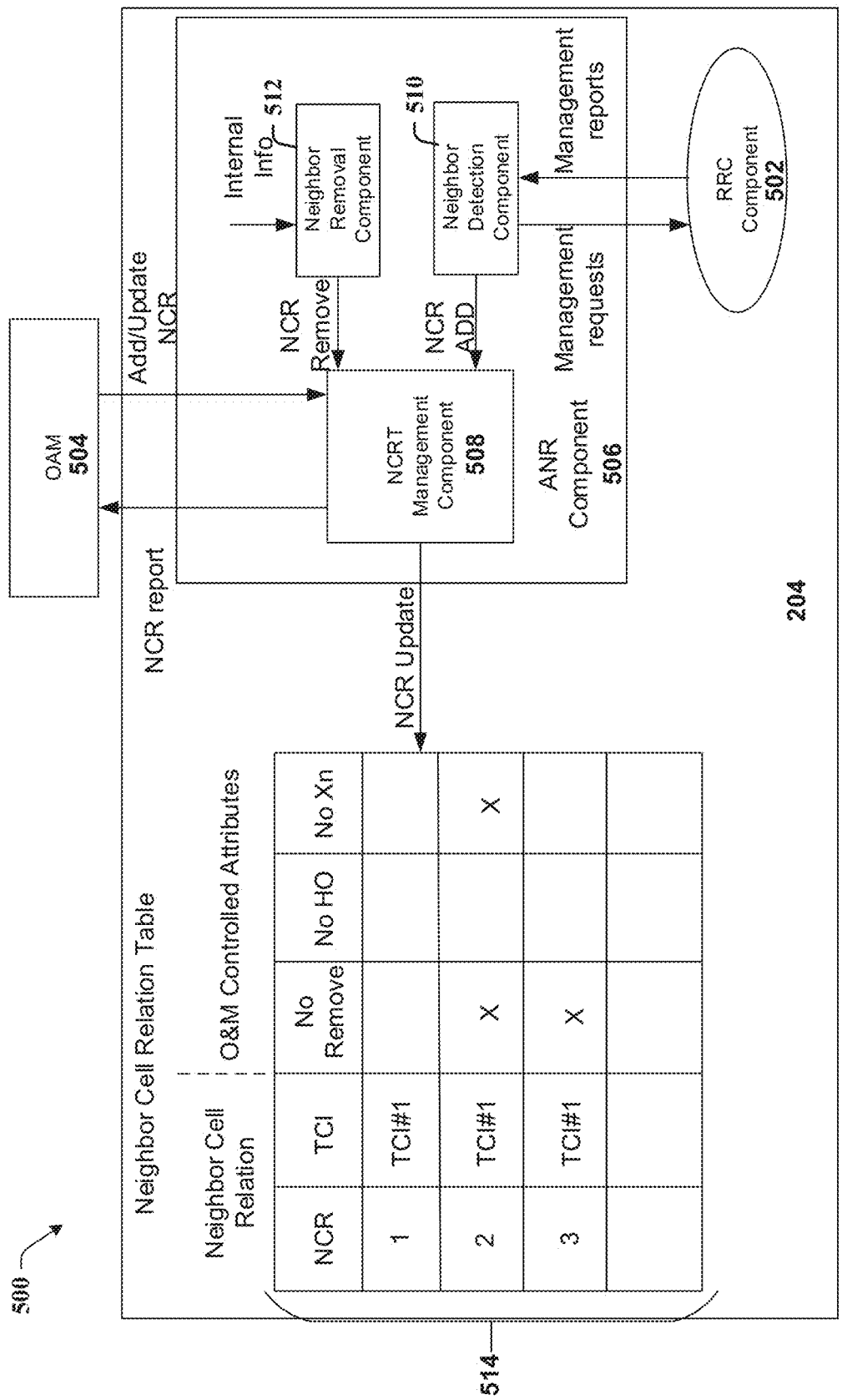
FIG. 5 illustrates an example schematic system block diagram of a 5G radio access technology neighbor cell relationships according to one or more embodiments.

Referring now to FIG. 5 illustrates an example schematic system block diagram of a 5G intra-radio access technology neighbor cell relationship system 500 according to one or more embodiments. In addition to the traditional ANR table that can comprise the no remove, no handover, and Xn as basic info, additional columns can be added to the table 514. The additional columns can comprise 5G NR-LTE DC preference, RAT (e.g., 5G or LTE) virtualized cell, gNB-CU ID, gNB-DU ID, etc. Because some cells may not be preferred for dual connectivity, the additional data can be added to the table 514 to help the system 500 to make more intelligent decisions. The gNB-CU ID, and gNB-DU ID can indicate, for a particular cell, which DU and/or which CU it belongs to within the hierarchical structure. Additional table attributes can indicate whether a particular cell belongs to a CU and/or DU that has been virtualized. If the cell has been virtualized, then the cell can be more efficient from a processing perspective. Thus, the virtualized cell can be a preferred cell for efficiency purposes.

The system 500 can comprise an operations administration and management (OAM) component 504 that can bi-directionally communicate with an ANR component 506 of the vCU 204, 304. For example, the ANR component 506 can comprise an NCRT management component 508, a neighbor removal component 512, and a neighbor detection component 510. The neighbor removal component 512 can be configured to remove neighbor relations based on internal data (e.g., quality, location, virtualization, etc.) of the ANR component 506 and send neighbor removal data to the NCRT management component 508. Conversely, a neighbor detection component 510 can detect neighbors based on data received (e.g., quality, location, virtualization, etc.) from a radio resource control (RRC) component 502. For example, the neighbor detection component 510 can send management request data to the RRC component 502 and in return receive management report data from the RRC component 502. Based on the management report data, the neighbor detection component 510 can then generate neighbor data and send the neighbor data to the NCRT management component 508 to facilitate the addition of a neighbor relationship. The OAM component 504 can also add/update neighbor relationships at the NCRT management component 508 and receive reports from the NCRT management component 508. The NCRT management component 508 can take data from the OAM component 504, the neighbor detection component 510, and/or the neighbor removal component 512 and generate data to send to the NCRT 514 to update the NCRT 514.

Referring now to FIG. 6, illustrated is an example schematic system block diagram of a 5G intra-radio access technology neighbor cell relationship and inter-radio access technology neighbor cell relationship table according to one or more embodiments. A 5G intra-RAT table 600 depicts four 5G cells, of which cells 1 and 2 share the same DU and CU, cell 3 shares the same CU as cells 1 and 2 but has a different DU. Cell 4 has a different DU and CU from any of the other cells 1-3. No Xn means that there is no Xn interface between the vCUs 204, 304. Targeted cell identifier (TCI) can be another field in the table. With regards to the inter-RAT table 602, the CU can see an LTE neighbor. Additional attributes can provide more information about the cells (e.g., whether CU is virtualized, DC preferred or not preferred, DC supported or not supported) that can allow for selection of cells based on policy and/or certain conditions.

Figure 7:
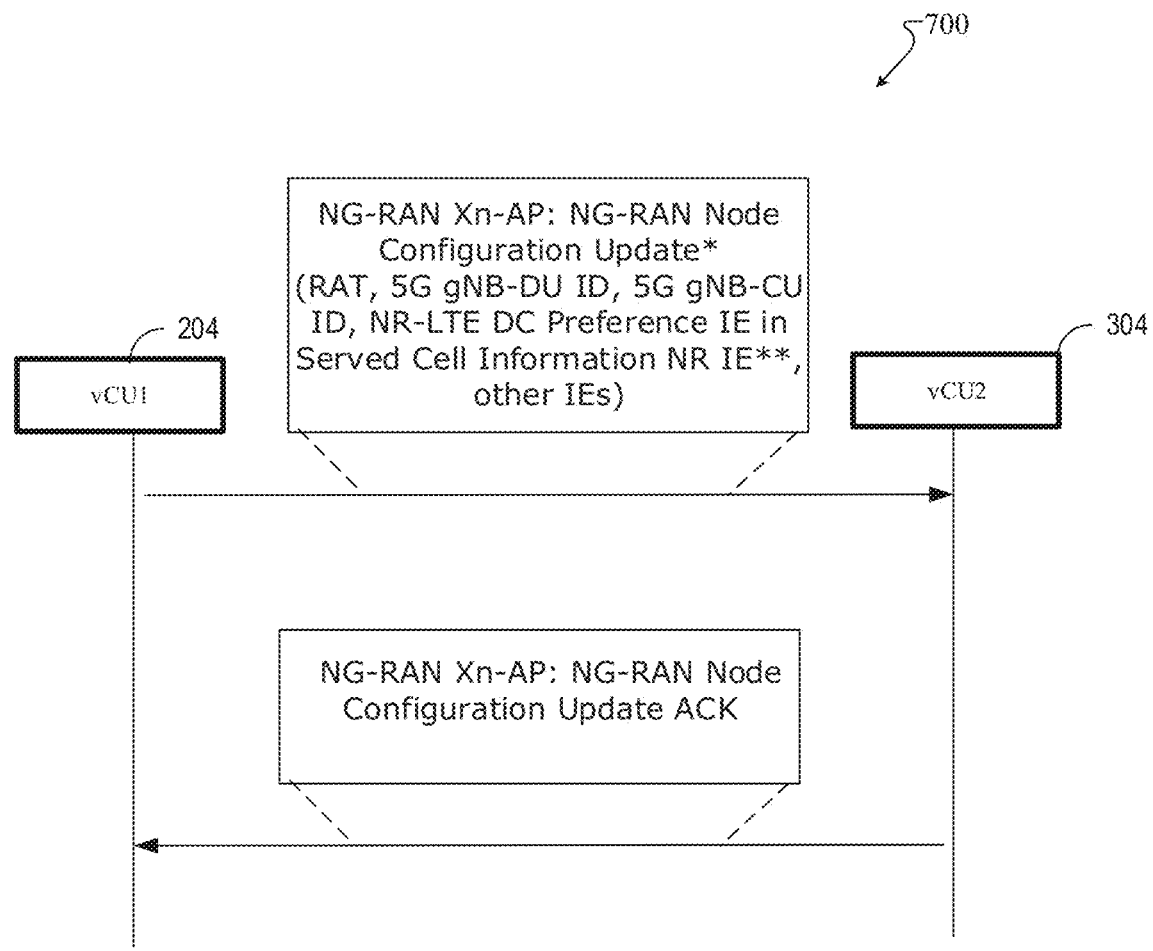
FIG. 7 illustrates an example schematic system block diagram of neighbor relation information elements according to one or more embodiments.

Referring now to FIG. 7, illustrated is an example schematic system block diagram of neighbor relation information elements 700 according to one or more embodiments. Attributes for the messages can be changed between vCUs 204, 304. For example vCU1 204 can send the attributes (e.g., 5G NR-LTE DC preference, RAT (e.g., 5G or LTE) virtualized cell, gNB-CU ID, gNB-DU ID) to the vCU2 304. The vCU2 304 can then acknowledge that data that it received from the vCU1 204 and sent acknowledgment data back to the vCU1 204. These embodiments can be integrated with a system optimization network (SON) to provide network automation and traffic optimization. This disclosure can also be extended to LTE ANR if virtualized LTE RAN and/or to future 5G plus RANs.

Figure 8:
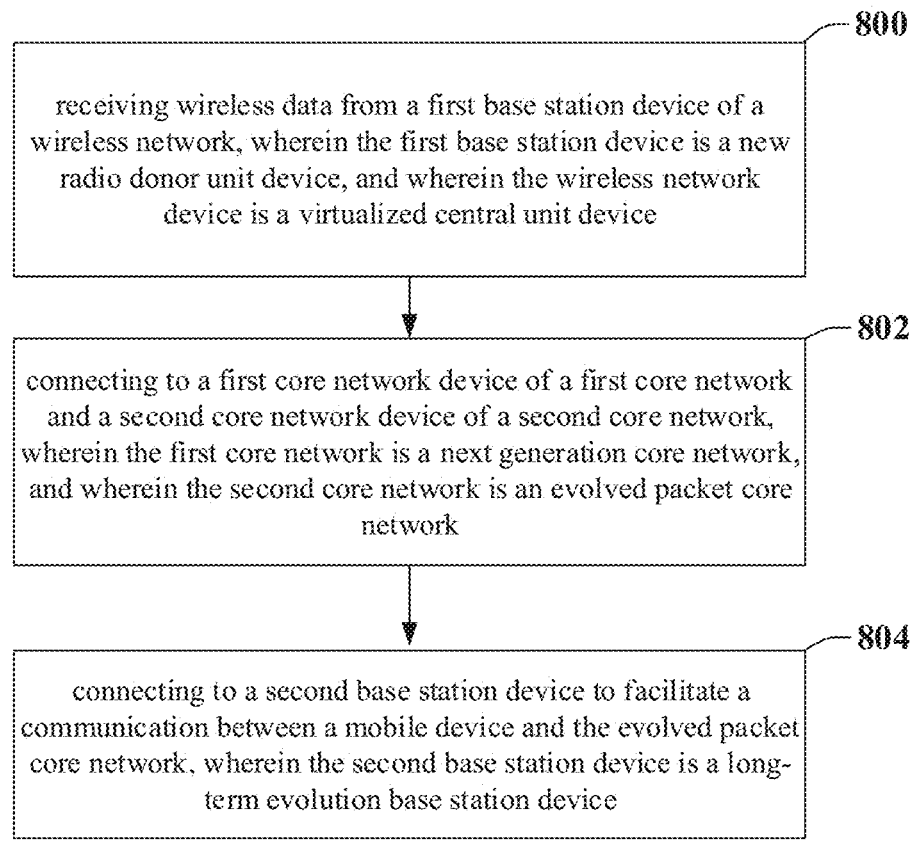
FIG. 8 illustrates an example flow diagram for a method for facilitating an automatic neighbor relationship for a 5G network according to one or more embodiments.

Referring now to FIG. 8, illustrated is an example flow diagram for of method for facilitating automatic neighbor relationships. At element 800, the method can comprise receiving wireless data from a first base station device of a wireless network, wherein the first base station device is a new radio donor unit device, and wherein the wireless network device is a virtualized central unit device. At element 802, the method can comprise connecting to a first core network device of a first core network and a second core network device of a second core network, wherein the first core network is a next generation core network, and wherein the second core network is an evolved packet core network. Additionally, at element 804, the method can comprise connecting to a second base station device to facilitate a communication between a mobile device and the evolved packet core network, wherein the second base station device is a long-term evolution base station device.

Figure 9:
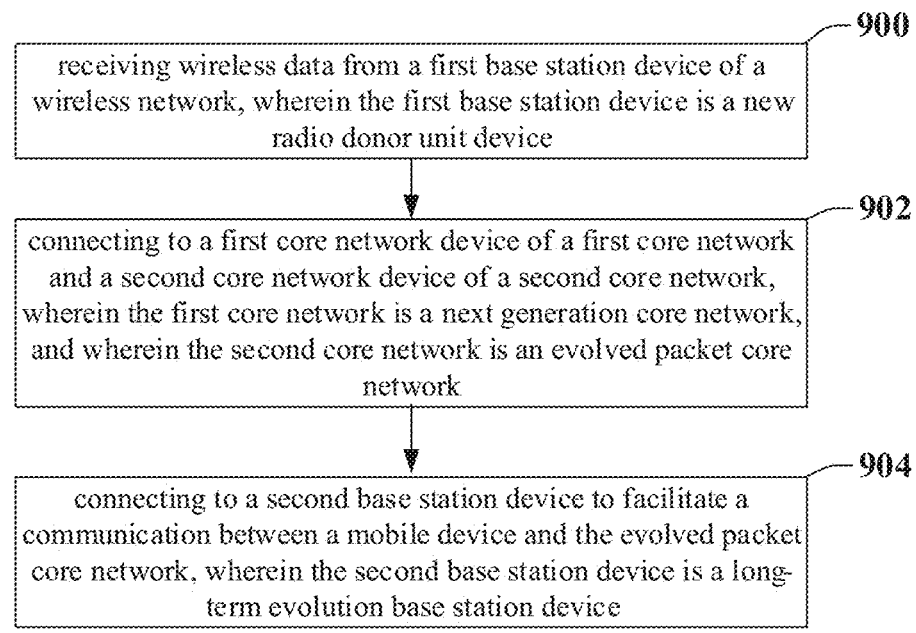
FIG. 9 illustrates an example flow diagram for a system for facilitating an automatic neighbor relationship for a 5G network according to one or more embodiments.

Referring now to FIG. 9, illustrated is an example flow diagram for a system for facilitating automatic neighbor relationships. At element 900, the system can facilitate, receiving wireless data from a first base station device of a wireless network, wherein the first base station device is a new radio donor unit device. At element 902, the system can comprise connecting to a first core network device of a first core network and a second core network device of a second core network, wherein the first core network is a next generation core network, and wherein the second core network is an evolved packet core network. Furthermore, at element 904, the system can comprise connecting to a second base station device to facilitate a communication between a mobile device and the evolved packet core network, wherein the second base station device is a long-term evolution base station device.

Figure 10:
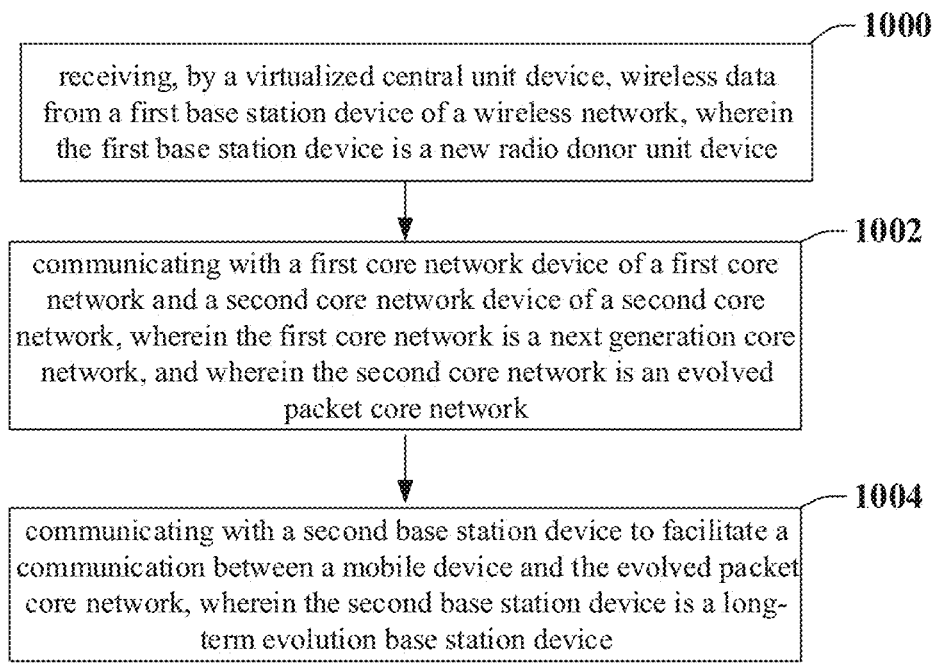
FIG. 10 illustrates an example flow diagram for a machine-readable medium for facilitating an automatic neighbor relationship for a 5G network according to one or more embodiments.

Referring now to FIG. 10, illustrated is an example flow diagram for a machine-readable medium for facilitating automatic neighbor relationships. At element 1000, the machine-readable medium can comprise receiving, by a virtualized central unit device, wireless data from a first base station device of a wireless network, wherein the first base station device is a new radio donor unit device. The machine-readable storage medium can perform the operations comprising communicating with a first core network device of a first core network and a second core network device of a second core network at element 1002, wherein the first core network is a next generation core network, and wherein the second core network is an evolved packet core network. Furthermore, at element 1004, the machine-readable storage medium can perform the operations comprising communicating with a second base station device to facilitate a communication between a mobile device and the evolved packet core network, wherein the second base station device is a long-term evolution base station device.

Figure 11:
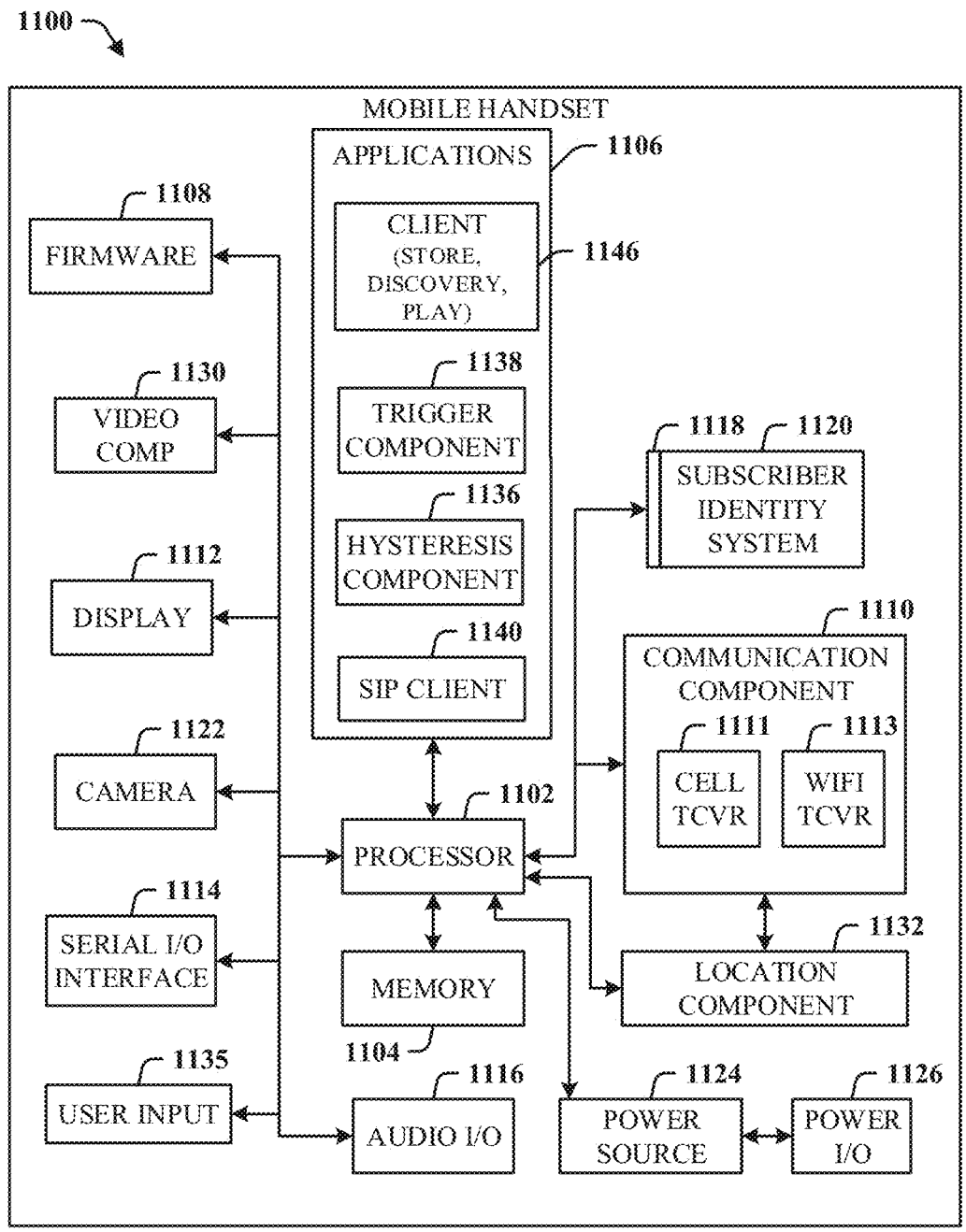
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
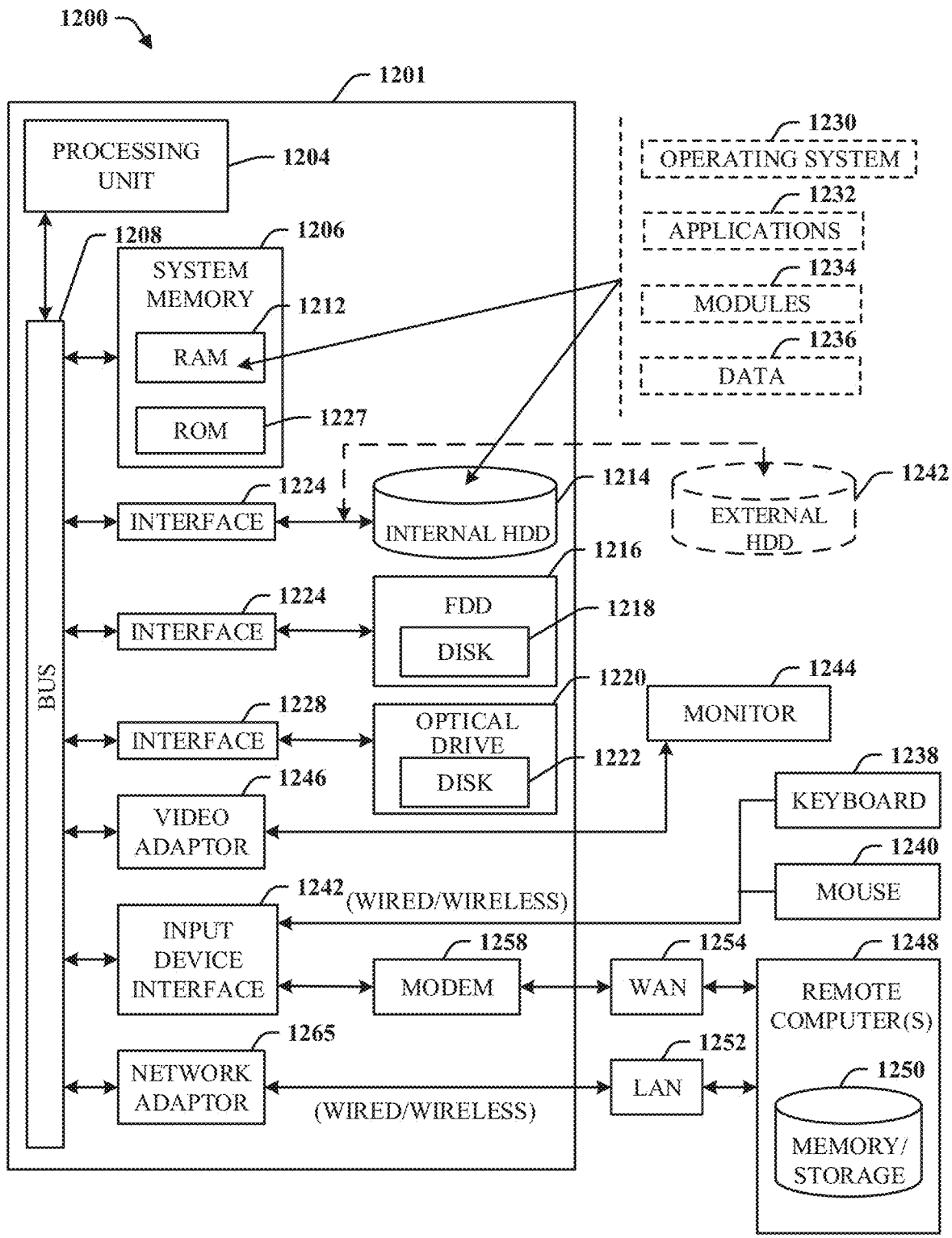
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof. FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by network equipment comprising a processor, data from a first base station via a network, wherein the first base station comprises a new radio donor unit device, and wherein the network equipment comprises a virtualized central unit device;
connecting, by the network equipment, to first core network equipment via a first core network and second core network equipment via a second core network, wherein the first core network is a next generation core network, and wherein the second core network is an evolved packet core network; and
connecting, by the network equipment, to a second base station to facilitate a communication between a user equipment and the evolved packet core network, wherein the second base station is a long-term evolution base station.

2. The method of claim 1, wherein the user equipment mobile device communicates with the long-term evolution base station via a long-term evolution user plane signal, and wherein the user equipment communicates with the first base station device via a fifth generation user plane signal.

3. The method of claim 1, wherein the user equipment communicates with the long-term evolution base station via a long-term evolution control plane signal.

4. The method of claim 3, wherein the control plane signal is a first control plane signal, and wherein the long-term evolution base station communicates with the virtualized central unit via a second control plane signal.

5. The method of claim 4, wherein the long-term evolution base station communicates with the second core network equipment via a third control plane signal.

6. The method of claim 1, wherein the virtualized central unit is a first virtualized central unit, and wherein the first core network equipment communicates with a second virtualized central unit via a user plane signal.

7. The method of claim 1, wherein the virtualized central unit is a first virtualized central unit, and wherein the first core network equipment communicates with a second virtualized central unit via a control plane signal.

8. A virtualized central unit, comprising:
a processor; and
a memory that stores executable instructions that, when executed by the processor, facilitate performance of operations, comprising:
receiving, by the virtualized central unit, data from a first base station a network, wherein the first base station comprises a new radio donor unit device;
connecting, by the virtualized central unit, to first core network equipment via a first core network and second core network equipment via a second core network, wherein the first core network is a next generation core network, and wherein the second core network is an evolved packet core network; and
connecting, by the virtualized central unit, to a second base station to facilitate a communication between a user equipment and evolved packet core network equipment associated with the evolved packet core network, wherein the second base station device is a long-term evolution base station.

9. The virtualized central unit of claim 8, wherein the virtualized central unit is a first virtualized central unit, and wherein the first core network equipment communicates with a second virtualized central unit via a user plane signal.

10. The virtualized central unit of claim 9, wherein a data structure of the first virtualized central unit comprises a first transmission point associated with the first virtualized central unit and a second transmission point associated with the second virtualized central unit.

11. The virtualized central unit of claim 10, wherein the data structure of the first virtualized central unit lists the first transmission point and the second transmission point as neighboring transmission point.

12. The virtualized central unit of claim 9, wherein the new radio donor unit comprises a first new radio donor unit, and wherein the second virtualized central unit communicates with a second new radio donor unit of ia the network.

13. The virtualized central unit of claim 12, wherein the first new radio donor unit and the second new radio donor unit are neighboring new radio donor units devices.

14. The virtualized central unit of claim 8, wherein the new radio donor unit neighbors the second base station.

15. The virtualized central unit of claim 8, wherein the new radio donor unit comprises a radio unit.

16. A non-transitory machine-readable medium, comprising executable instructions that, when executed by a processor, facilitate performance of operations, comprising:
receiving, by a virtualized central unit, data from a first base station via a network, wherein the first base station is a new radio donor unit;
communicating, by the virtualized central unit, with first core network equipment via a first core network and second core network equipment via a second core network, wherein the first core network is a next generation core network, and wherein the second core network is an evolved packet core network; and
communicating, by the virtualized central unit, with a second base station to facilitate a communication between a mobile device and the evolved packet core network, wherein the second base station is a long-term evolution base station.

17. The non-transitory machine-readable medium of claim 16, wherein the virtualized central unit is a first virtualized central unit, wherein the first core network equipment communicates with a second virtualized central unit via a user plane signal, and wherein the new radio donor unit communicates with a transmission reception point via a hierarchical anchor cell neighbor relationship.

18. The non-transitory machine-readable storage medium of claim 17, wherein a data structure of the first virtualized central unit comprises a first reception point associated with the first virtualized central unit and a second reception point associated with the second virtualized central unit, wherein the new radio donor unit is a first new radio donor unit, and wherein the first new radio donor unit and a second new radio donor unit are neighboring new radio donor units devices.

19. The non-transitory machine-readable medium of claim 18, wherein the data structure of the first virtualized central unit comprises handover data representative of a determination of a handover to be satisfied between the neighboring new radio donor units.

20. The non-transitory machine-readable medium of claim 18, wherein the data structure of the first virtualized central unit comprises removal data representative of a removal status of a neighbor relationship between the first new radio donor unit and the second new radio donor unit.

\* \* \* \* \*